Figure 1:
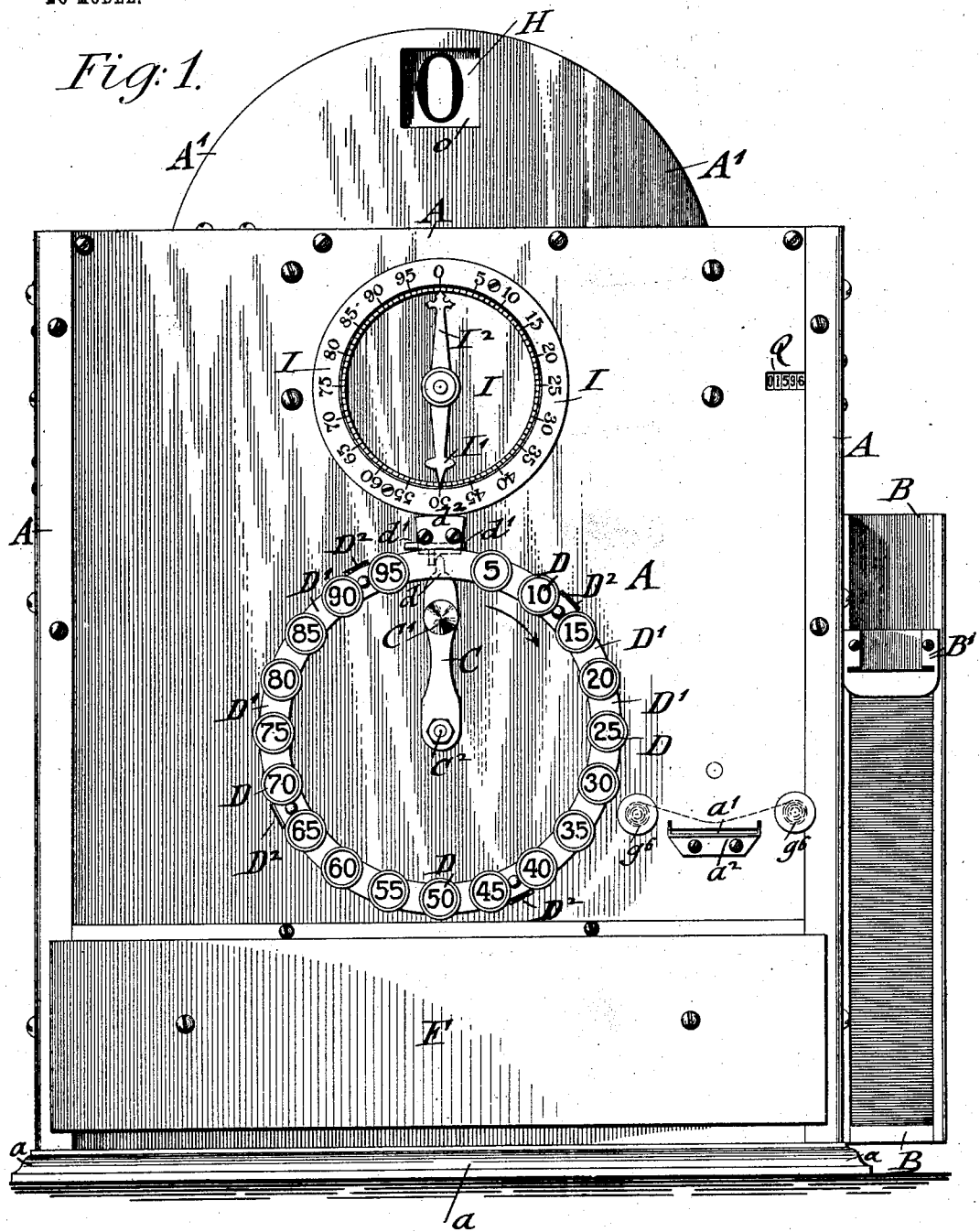

No. 721,981. PATENTED MAR. 3, 1903.
J. C. VAHJEN.
ELECTRICAL CASH REGISTER.
APPLICATION FILED MAY 9, 1902.

NO MODEL. 7 SHEETS—SHEET 1.

WITNESSES:

INVENTOR
Johann C. Vahjen
BY
ATTORNEYS

No. 721,981. PATENTED MAR. 3, 1903.
J. C. VAHJEN.
ELECTRICAL CASH REGISTER.
APPLICATION FILED MAY 9, 1902.
NO MODEL. 7 SHEETS—SHEET 2.

WITNESSES:
C. Bradway.
Karl Kaeble

INVENTOR
Johann C. Vahjen
BY
ATTORNEYS

No. 721,981. PATENTED MAR. 3, 1903.
J. C. VAHJEN.
ELECTRICAL CASH REGISTER.
APPLICATION FILED MAY 9, 1902.
NO MODEL. 7 SHEETS—SHEET 3.
*Fig:3.*
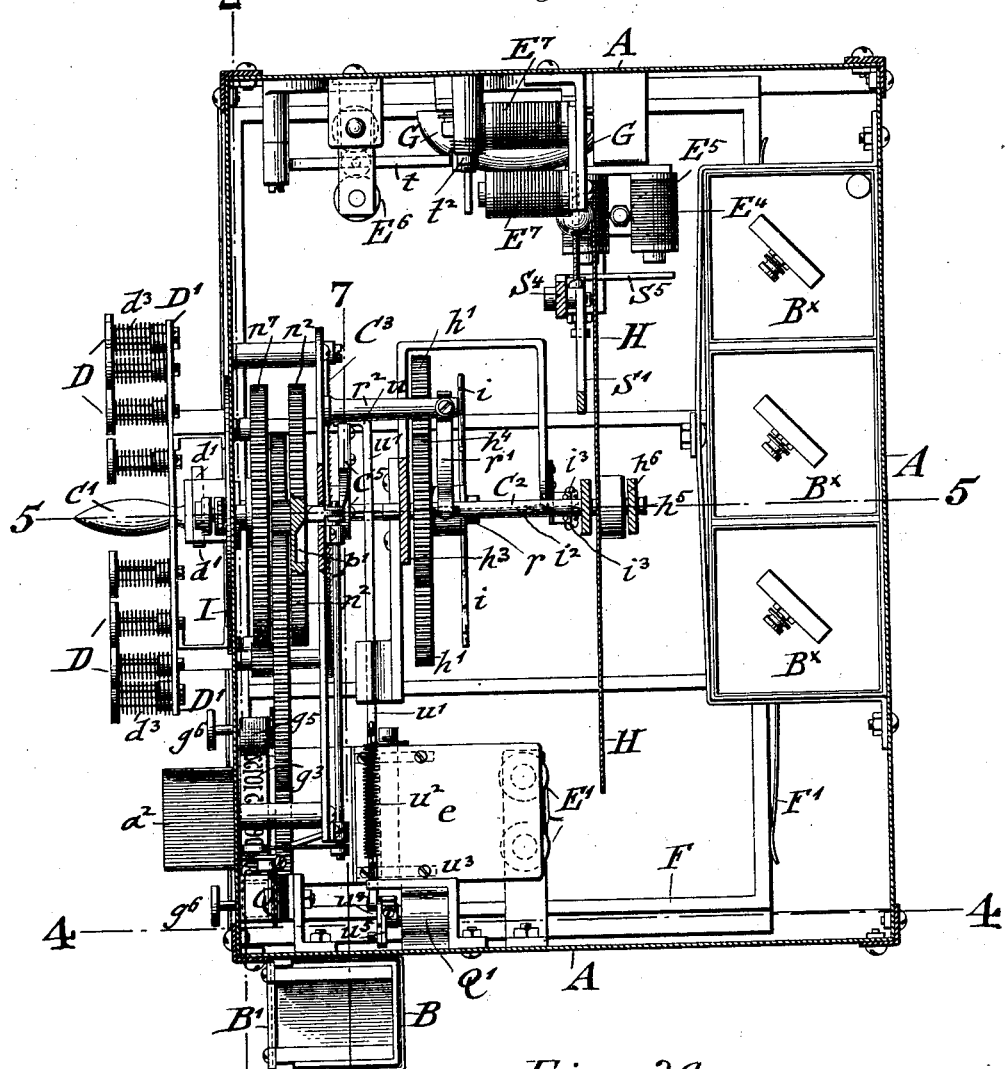
*Fig:3ª*
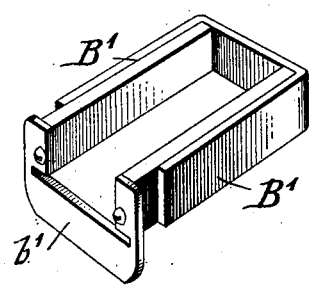
WITNESSES:
C. Bradway
Karl Karlsen
INVENTOR
Johann C. Vahjen
BY Goepel & Niles
ATTORNEYS No. 721,981. PATENTED MAR. 3, 1903.
J. C. VAHJEN.
ELECTRICAL CASH REGISTER.
APPLICATION FILED MAY 9, 1902.
NO MODEL. 7 SHEETS—SHEET 4.

WITNESSES:
C. Bradway.
Karl Kaelble

INVENTOR
Johann C. Vahjen
BY
Gower Niles
ATTORNEYS

No. 721,981. PATENTED MAR. 3, 1903.
J. C. VAHJEN.
ELECTRICAL CASH REGISTER.
APPLICATION FILED MAY 9, 1902.
NO MODEL. 7 SHEETS—SHEET 5.

WITNESSES: C. Bradway, Karl Hauold

INVENTOR Johann C. Vahjen
BY Gorwein Niles
ATTORNEYS

No. 721,981. PATENTED MAR. 3, 1903.
J. C. VAHJEN.
ELECTRICAL CASH REGISTER.
APPLICATION FILED MAY 9, 1902.
NO MODEL. 7 SHEETS—SHEET 6.
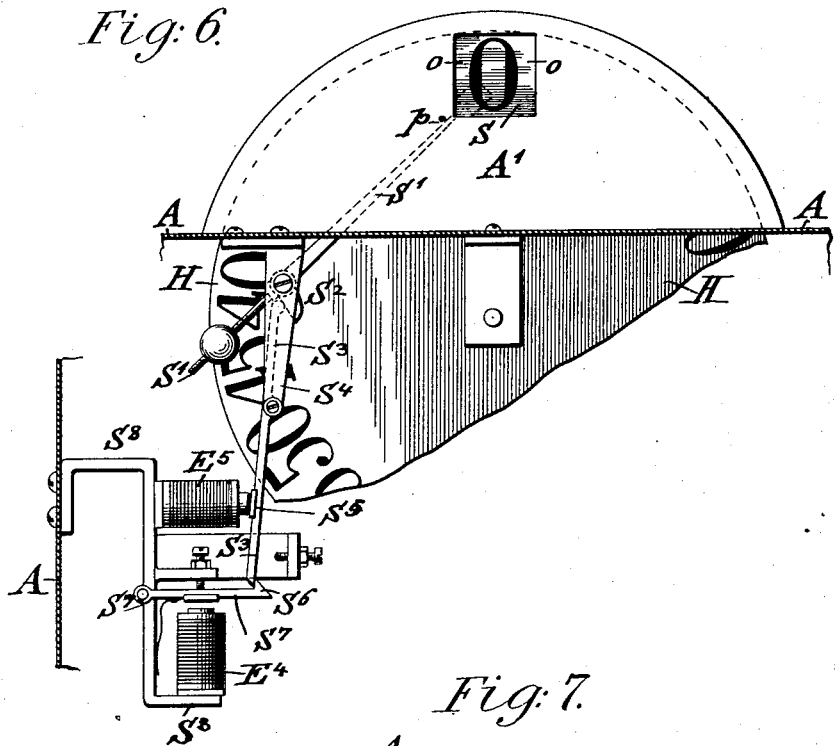
Fig: 6.
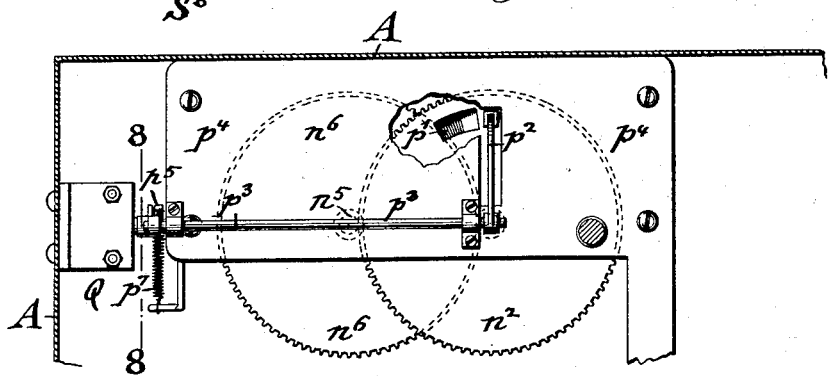
Fig: 7.
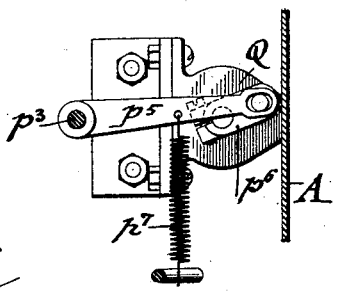
Fig: 8.
WITNESSES:
C. Bradway.
Karl Hauble
INVENTOR
Johann C. Vahjen
BY
Loewen Niles
ATTORNEYS

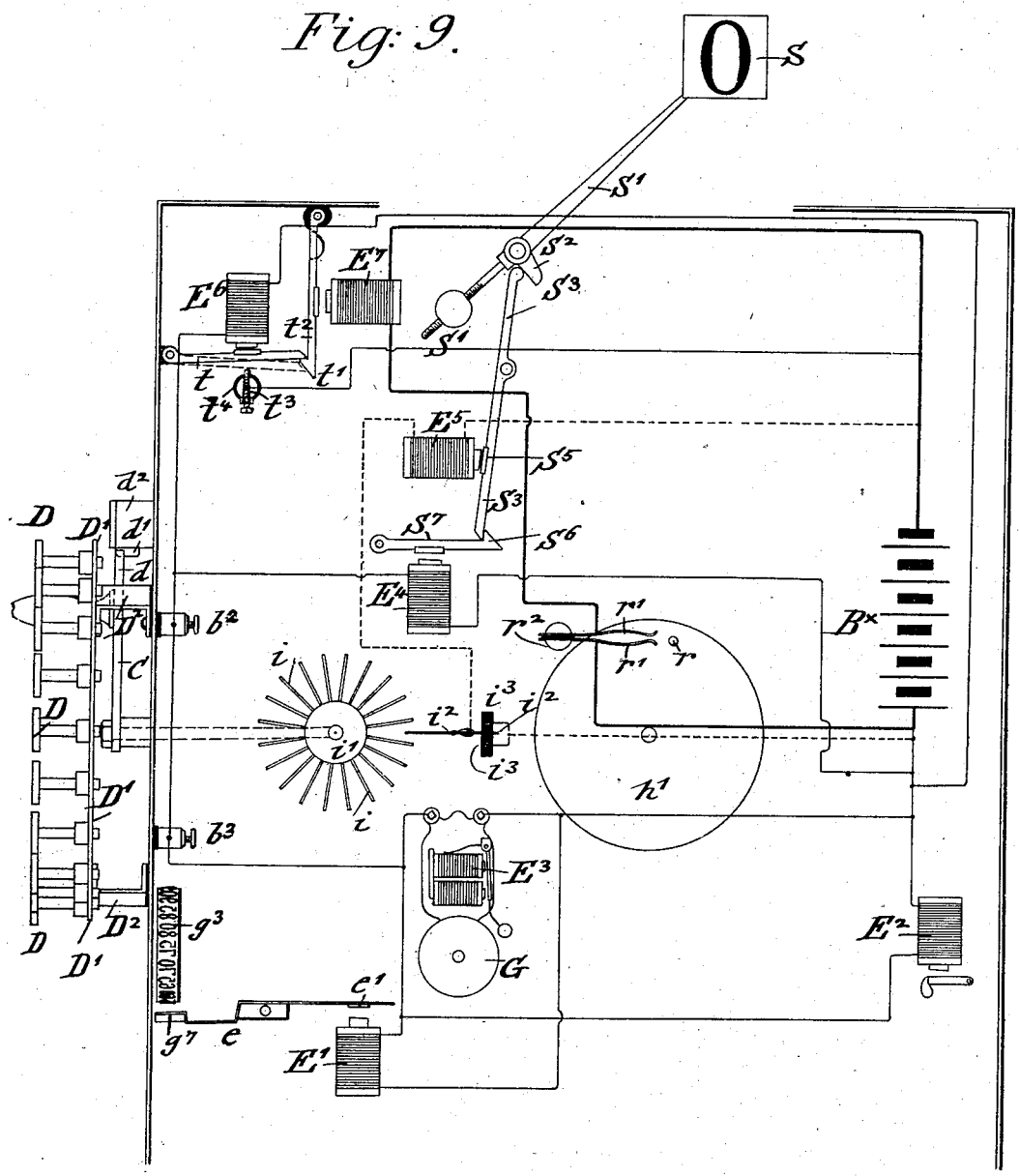

UNITED STATES PATENT OFFICE.

JOHANN C. VAHJEN, OF NEW YORK, N. Y., ASSIGNOR TO JOHN H. VAHJEN, OF BROOKLYN, NEW YORK.

ELECTRICAL CASH-REGISTER.

SPECIFICATION forming part of Letters Patent No. 721,981, dated March 3, 1903.

Application filed May 9, 1902. Serial No. 106,507. (No model.)

*To all whom it may concern:*

Be it known that I, JOHANN C. VAHJEN, a citizen of the Empire of Germany, residing in New York, borough of Manhattan, and State of New York, have invented certain new and useful Improvements in Electric Cash-Registers, of which the following is a specification.

This invention relates to certain improvements in electrically-operated cash-registers in which by the depression of a key and the turning of an operating-crank a number of operations is simultaneously performed—namely, the printing of a ticket with the amount of the purchase, the releasing and opening of the cash-drawer, the ringing of an alarm, the registering the number of the sale, the registering of the total amount of sales, and the visual indication of the individual sale to the purchaser—said operations being performed by means of mechanisms actuated by electromagnets, the different operative parts being returned to their normal positions on the return of the operating-crank to the normal or zero position immediately before the next operation of the crank; and for these purposes the invention consists of an electric cash-register which comprises a number of spring-actuated keys arranged in a circle, said keys being provided with consecutive numbers, each representing the amount of a sale; a centrally-pivoted crank for forming contact with the shank of the key that has been depressed, so as to close an electric circuit containing a plurality of electromagnets for performing the different operations; means for printing the amount of the sale on a ticket corresponding with the number on the depressed key by means of a printing-cylinder; an ink-ribbon and a platen, the latter being operated by the armature of an electromagnet; means for releasing and opening the cash-drawer on the attraction of the armature of another electromagnet; an alarm device actuated in the usual manner by an electromagnet; a disk operated by suitable transmitting gear-wheels from the operating-crank, so as to expose visually the number corresponding to the amount of the sale; an oscillating shutter placed in front of the figures on the disk, said shutter being dropped by the action of an electromagnet at the proper time, so as to indicate on the disk the number corresponding to the amount of the sale; a graduated dial and index-hands operated by the crank for adding up the sales for a given length of time; means connected with said registering devices for registering the total number of sales for a greater length of time, and electrically-operated means for restoring the circuits to their normally open condition after the different operations are performed and the operative parts returned to their normal positions on the return of the crank to its zero or starting point; and the invention consists, further, of certain details of construction and combination of parts, which will be fully described hereinafter and finally pointed out in the claims.

Figure 2:
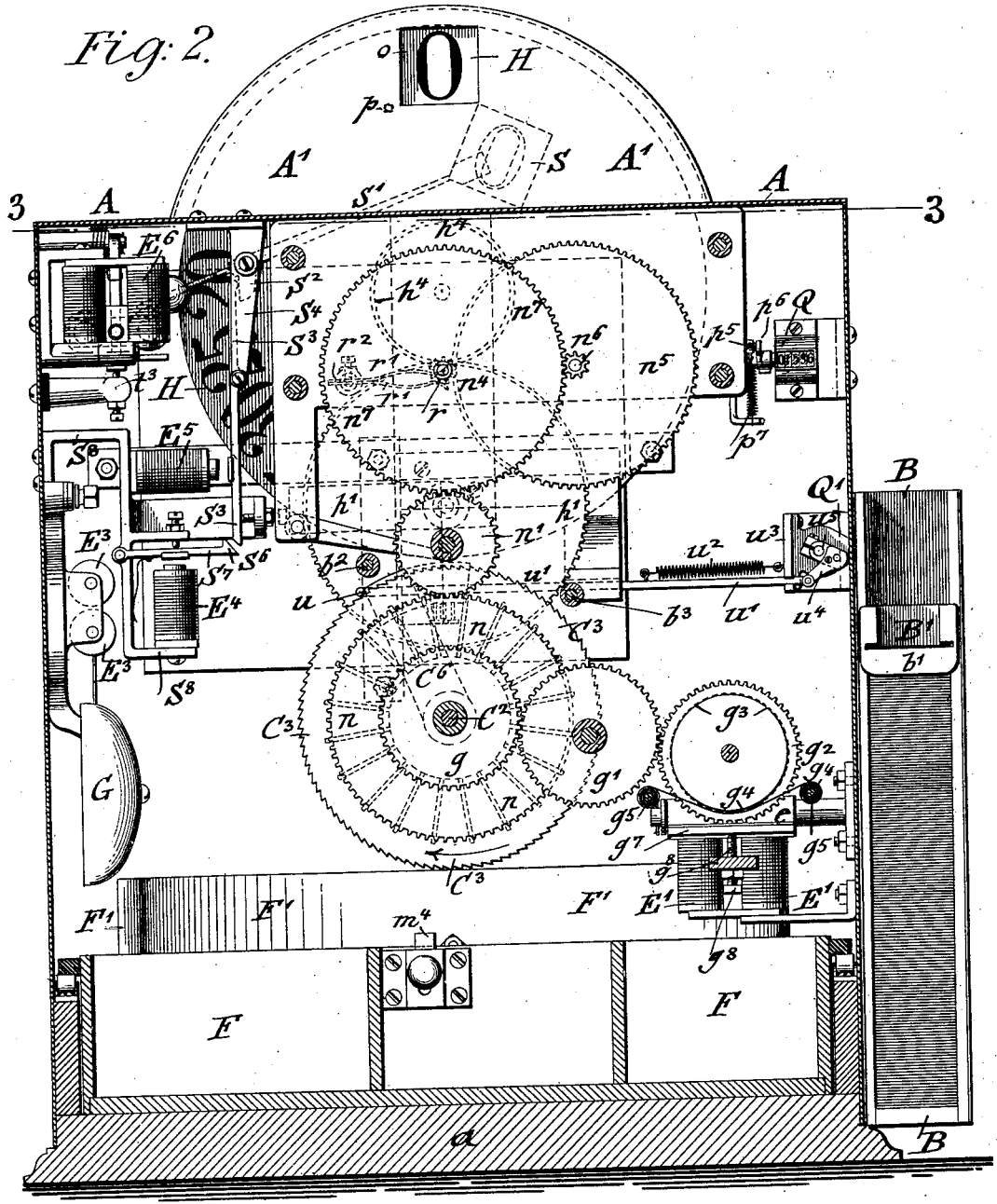
Figure 4:
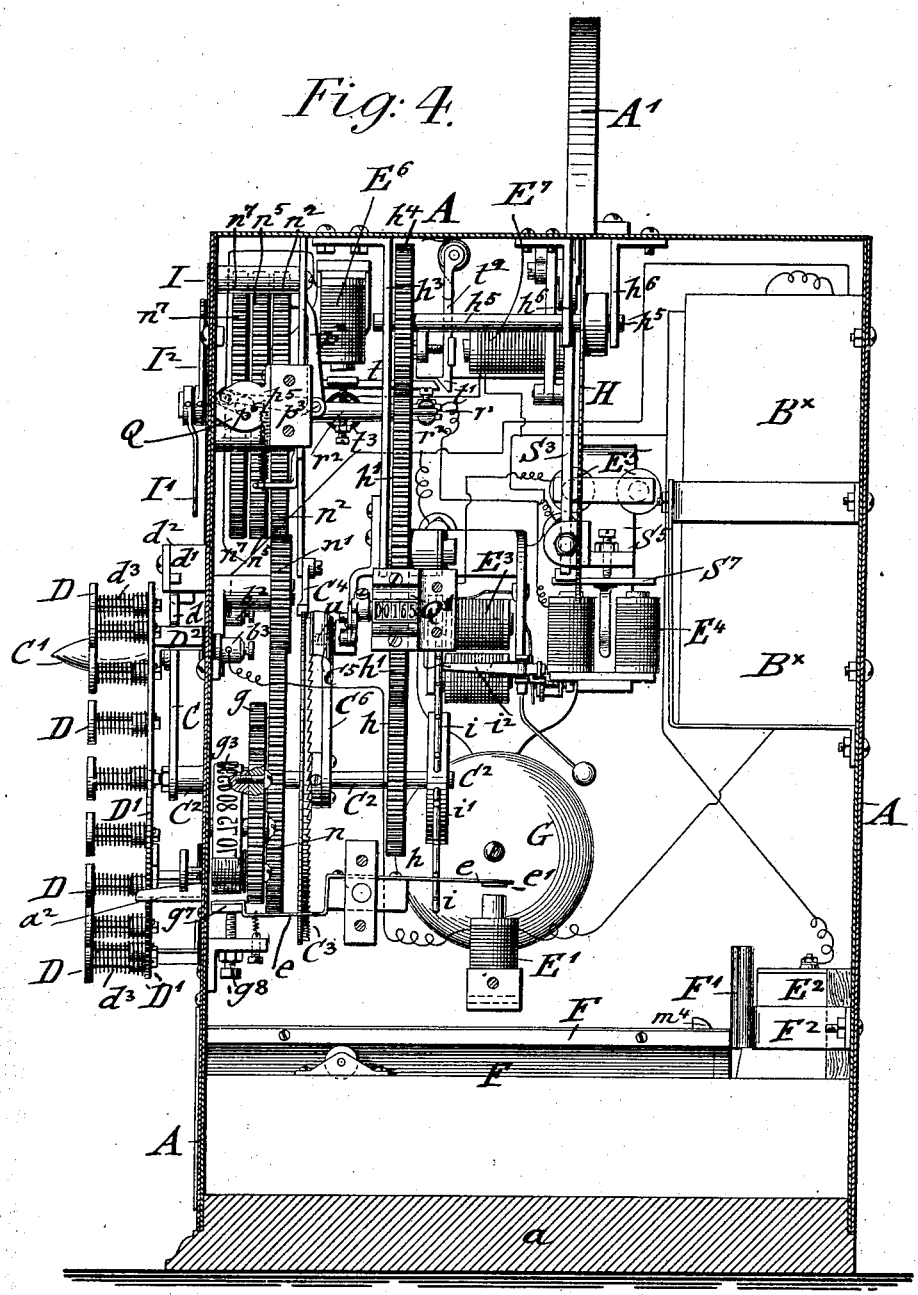
Figure 5:
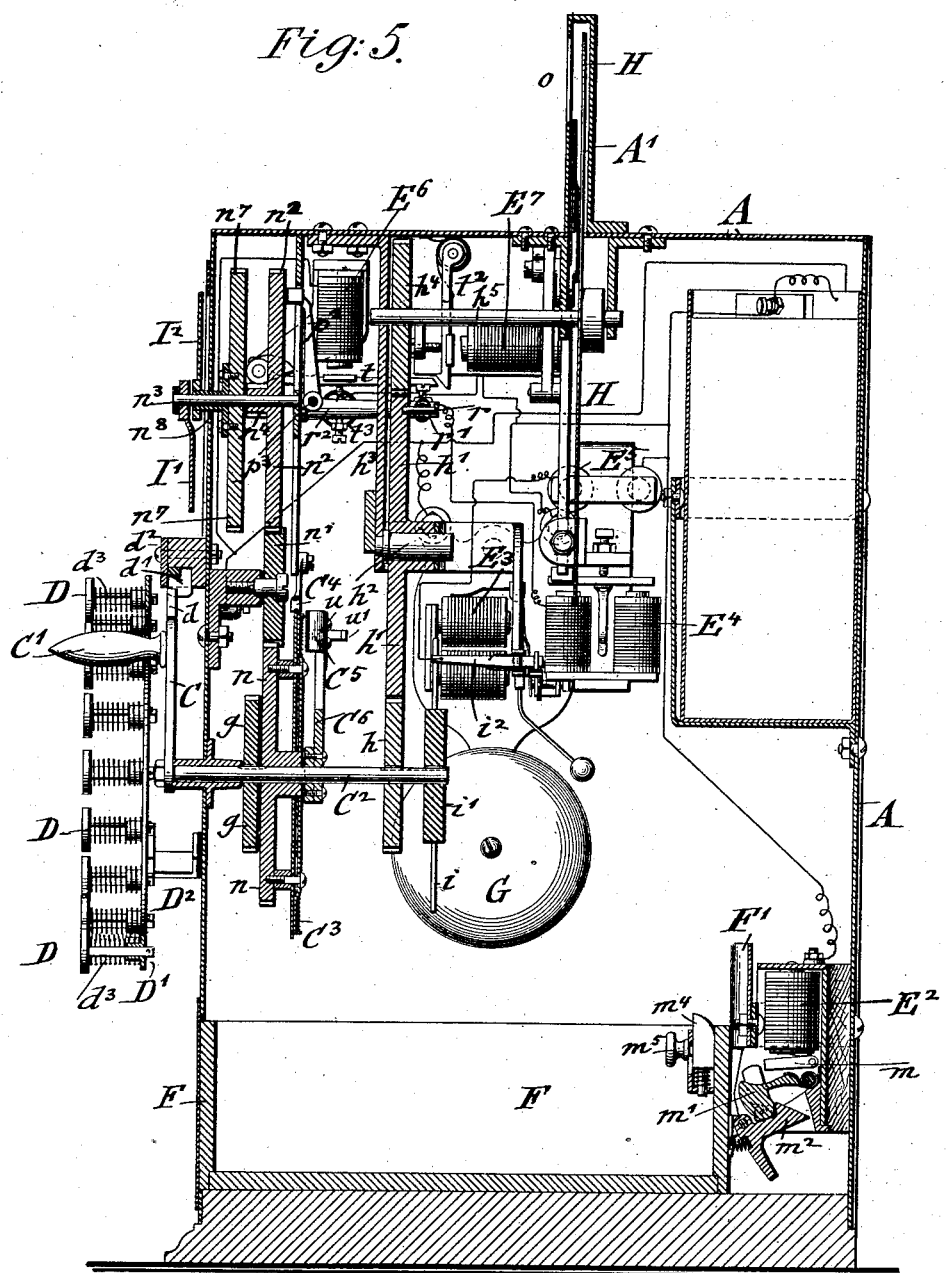

In the accompanying drawings, Figure 1 is a front elevation of my improved electric cash-register. Fig. 2 is a front elevation of the interior parts of the same, partly in section, on line 2 2, Fig. 3. Fig. 3 is a plan view, partly in section, on line 3 3, Fig. 2. Fig. 3ᵃ is a detail perspective view of the sliding weight of the ticket-holder. Figs. 4 and 5 are vertical transverse sections, respectively, on lines 4 4 and 5 5, Fig. 3. Fig. 6 is a detail front elevation of the sales-indicating disk by which the amount of each sale is indicated, showing its shutter in normal position. Fig. 7 is a rear elevation, with a part broken away, on line 7 7, Fig. 3, of the mechanism for transmitting motion from the sales-counting device to the registering device. Fig. 8 is a detail side elevation, partly in section, on line 8 8, Fig. 7, of the crank-motion by which the registering device is operated, said figure being drawn on a larger scale; and Fig. 9 is a diagram showing the different operating-circuits of my improved cash-register.

Similar letters of reference indicate corresponding parts.

Referring to the drawings, A represents the exterior casing of my improved electric cash-register. The casing is made in the shape of a rectangular box provided with a bottom $a$, of wood or other suitable material. At the right-hand side of the casing is arranged a box-shaped ticket-holder B, which is attached to the side wall of the casing, near the front of the same, the tickets in said holder being held in position by a sliding weight B', that is guided in upright ways of the holder, and provided with a downwardly-extending and recessed front plate $b'$, the upper edge of which is below the uppermost ticket, so that one ticket at a time can be withdrawn from the pile of tickets over the recessed front plate of the receiver. Before the operation of the cash-register is started the holder is filled with tickets nearly up to the top and the weight B' placed in position on the same. When a sale is made, a ticket is first removed by the operator from the holder and inserted through a horizontal slot $a'$ in the front wall of the cash-register adjacent to the ticket-holder and over a horizontal bracket $a^2$ into the casing, so as to be placed in position below the printing device.

On the top part of the casing A is arranged a segmental casing A' for the sales-indicating disk H, which casing is provided with an opening $o$ in its front wall or with registering openings $o'$ in its front and rear walls. This casing covers the upper part of the sales-indicating disk H, as will be fully described hereinafter. When the amount of the sales is to be indicated at both sides of the cash-register, the sales-indicating disk is provided with corresponding figures on both sides, so as to exhibit the sales at both front and rear of case A of the cash-register. By this arrangement the amount of the sales can be seen by the operator and the purchaser whatever be the relative position of the cash-register toward the same.

To the front wall of the casing A is pivoted a crank C, provided with a handle C'. The end of the crank is provided with a finger $d$, which abuts against a sliding stop $d'$, that is supported in a suitable guide-box $d^2$, attached to the front wall of the casing vertically above the center of the pivot of the crank C, said stop serving to cushion the crank C on its return to zero. Concentrically with the axis of the crank-pivot is arranged a circular frame D', which carries a plurality of spring-actuated keys D. The circular frame D' is supported by lugs $D^2$ on the front wall of the casing, which lugs are insulated from the casing H. The keys D are guided in fixed sleeves on said frame, said sleeves having square recesses for guiding the correspondingly-shaped shanks of the keys. Helical springs $D^3$ are interposed between the keys D and the circular frame D', so as to return the keys into normal position as soon as the pressure on the same is released. Stop-pins at the rear ends of the shanks of the keys prevent them from getting detached from the circular frame. The keys D are provided with numbers that are either multiples of the figure five from "5" to "95," or with any other consecutive arrangement or sequence of numbers, as required by the business transactions for which the cash-register is to be used.

The pivot-shaft $C^2$ of the crank C extends through the front wall of the casing and is supported in a sleeve-shaped bearing of the same. On the shaft $C^2$ are mounted a number of motion-transmitting gear-wheels, the gear-wheel $g$, adjacent to the front wall of the casing A, intermeshing with an intermediate gear-wheel $g'$ and the latter with a third gear-wheel $g^2$, all of the same size, as shown in Fig. 2, said intermediate and third gear-wheels being supported in suitable bearings at the interior of the casing A. A third gear-wheel $g^2$ carries a printing-cylinder $g^3$, on the circumference of which are arranged a successive series of numbers corresponding to the numbers on the keys. Below the printing-cylinder $g^3$ is arranged an ink-ribbon $g^4$, which is held tightly in contact with the cylinder, said ink-ribbon being mounted on two small rollers $g^5$, provided with friction devices, the shafts of the rollers $g^5$ passing through openings in the front wall of the casing and carrying buttons $g^6$ for operating the ink-ribbon in one or the opposite direction. Below the ink-ribbon $g^4$ is placed a fulcrumed armature-lever $e$, carrying a platen $g^7$ at its front end, which rests on a stop-screw $g^8$. The armature-lever $e$ is under the tension of a helical spring. The rear part of the fulcrumed platen-carrying armature-lever $e$ carries the armature $e'$, below which is arranged an electromagnet E', which is placed in the main circuit of an electric battery $B^\times$, that is supported on the rear wall of the casing A, as shown in Figs. 3, 4, and 5.

The front wall of the casing A is provided with two binding-posts $b^2$ $b^3$, of which the binding-post $b^2$ is metallically connected with one of the supporting-lugs of the circular key-frame D', and thereby with the shanks of the keys D, while the other is insulated from the casing A. When a key is depressed and the crank C moved in the direction of the arrow, Fig. 1, until it abuts against the shank of the depressed key, the main circuit of the battery is closed through the crank and the casing and through the key and binding-post $b^2$. The closing of the main circuit excites the electromagnet E' and simultaneously therewith a number of additional electromagnets $E^2$, $E^3$, $E^4$, and $E^6$, which are located in the same circuit, for the purposes hereinafter described. The electromagnet E' attracts the armature of the platen-carrying lever $e$ and presses thereby the platen against the ink-ribbon and the latter against the circumference of the printing-cylinder $g^3$, so that the amount of the sale, which corresponds to the number on the depressed key, is printed on the ticket inserted through the slot $a'$, for the reason that the printing-cylinder has been moved proportionately through the same distance by its transmitting gear-wheels as the operating-crank from its initial or zero position to the shank of the depressed key. The ticket thus printed with the amount of the sale is then handed to the purchaser. Simultaneously with the closing of the main circuit the armature $m$ of electromagnet $E^2$ is attracted. This electromagnet is supported on the rear wall of the casing A and located near the rear wall of the cash-drawer F. Adjacent to the armature $m$ is suitably supported a spring-actuated locking-piece $m'$, that is provided with an arm $m^6$, adapted to impinge upon the free end of the armature when the latter is in lowermost position, as in the case when the electric current is broken, and which is adapted to move under the same when the armature is raised upon the excitation of the electromagnet $E^2$, so as to release the spring-actuated latch $m^2$, that is mounted on the rear wall of the drawer F, as shown in Fig. 5. A strong bent spring $F'$, of flat steel, which is supported on a bracket $F^2$, attached to the rear end of the casing A and whose ends press against the rear wall of the cash-drawer, is thereby permitted to expand, so as to push the cash-drawer forward into open position and permit the deposit of the money representing the amount of the sale. The rear wall of the cash-drawer F is provided with a spring-actuated stop $m^4$, that projects above the upper edge of the drawer and prevents the drawer from being moved bodily clear of the front wall of the casing except when the spring-actuated stop $m^4$ is drawn downward by its button $m^5$. When the stop $m^4$ is drawn down so as to clear the upper edge of the front opening for the drawer, the cash-drawer may be entirely removed from the casing for removing and counting the money contained in the same. In replacing the drawer the rounded-off edge of the stop $m^4$ passes readily under the front edge of the drawer-opening of the casing. When the cash-drawer is pushed backwardly, so that the intermediate piece $m'$ interlocks with the latch $m^2$, causing the arm $m^6$ to abut against the free end of the armature, the flat spring $F'$ is simultaneously set to tension by the pressure of the drawer, so as to produce the opening of the cash-drawer when the electromagnet $E^2$ is energized by the next contact of the crank C with the shank of a key. Simultaneously with the printing of the ticket and the opening of the cash-drawer a signal-bell G is rung. This is accomplished by the electromagnet $E^3$, the armature of which carries a hammer that rings the bell G, so as to indicate by the audible signal that the cash-drawer is open.

The pivot-shaft $C^2$ of the crank C is provided near its rear end with a gear-wheel $h$, which meshes with a larger intermediate gear-wheel $h'$, that turns on a short shaft $h^2$, which is attached to a hanger-bracket $h^3$, suspended from the top of the casing A. The larger intermediate wheel $h'$ meshes with a gear-wheel $h^4$, which is keyed to the shaft of a sales-indicating disk H, the upper part of which extends above the top of the casing A into the segmental casing $A'$, as shown in Fig. 2. The shaft of the disk H is supported in suitable bearings of the hanger-bracket $h^3$ and auxiliary brackets $h^6$, attached to the top of the casing, as shown clearly in Figs. 4 and 5. When the operating-crank C is turned into contact with one of the keys at the front part of the casing, the disk is correspondingly turned on its axis by the transmitting gear-wheels $h\,h'\,h^4$, so that the number corresponding to the number on the key which has been depressed appears in the opening of the casing, as the disk is numbered so as to correspond to the numbers on the keys. The number appearing then in the front opening $o$ or in the front and rear openings $o'$ of the casing $A'$ is readily seen by the customer, who can then compare it with the number printed on his ticket and verify thereby the amount paid for his purchase.

At the interior of the main and segmental casings A $A'$ is arranged in front of the disk H a shutter S, which carries the figure "0" and which is supported at the upper end of a fulcrumed and counterbalanced lever $S'$. This lever carries a lug $S^2$, which engages the upper end of an armature-lever $S^3$, that is fulcrumed to a hanger-arm $S^4$, attached to the top of the casing, and provided below its fulcrum with an armature $S^5$, that is normally held in front of an electromagnet $E^5$ by the hook $S^6$ at the end of a pivoted and spring-actuated armature-lever $S^7$, as shown in Figs. 6 and 9. The hook $S^6$ engages the lower end of the armature-lever $S^3$, so that its upper end is held in contact with the lug $S^2$, and thereby the shutter S, supported in front of the sales-indicating disk, back of the opening $o$ of the segmental casing $A'$. The spring-actuated armature-lever $S^7$ is actuated by the electromagnet $E^4$, which is located in the main circuit of the battery and which is attracted at the moment when the main circuit is closed by the contact of the operating-crank C with the shank of one of the keys D. The attraction of the armature-lever $S^7$ by the electromagnet $E^4$ releases the hook $S^6$ from the armature-lever $S^3$ and permits the dropping of the shutter S, so as to expose the number on the sales-indicating disk H then in the opening $o$ of the casing $A'$, said number corresponding with the number on the depressed key and indicating thereby visually the amount of the sale. The dropped position of the shutter is shown in dotted lines in Fig. 2, while the normal or raised position is shown in Figs. 6 and 9.

The motions of the armature-levers $S^3$ and $S^7$ are limited in the usual manner by stop-screws and by the pole ends of the electromagnets $E^5$ and $E^4$. These electromagnets, their stop-screws, and the armature-lever $S^7$ are mounted on an angular bracket-arm $S^8$, that is attached to the side wall of the casing, as shown in Figs. 2 and 6. The return motion of the shutter S into its normal position in the opening $o$ is produced by the contact of one of the radial arms $i$, which are applied to a disk-shaped hub $i'$ at the rear end of the crank-shaft $C^2$, with an oscillating contact-spring $i^2$, which is supported at the interior of the casing and which closes a second circuit of the battery B×, in which the electromagnet E⁵ is located, as soon as the crank C is started on its return motion to the zero-point, so that the electromagnet E⁵ is energized, its armature-lever S³ attracted and its lower end reëngaged by the hook S⁶ on the armature-lever S⁷, while the upper end of the armature-lever S³ engages the lug S² and returns thereby the shutter-lever S′ and the shutter S into normal position back of the opening in the casing A′, as shown in Fig. 6. A stop-pin $p$ on the front wall of the auxiliary casing arrests the shutter S when it arrives in its raised or normal position. The radial arms $i$ on the hub $i'$ serve for the purpose of closing the circuit of the electromagnet E⁵ whether the crank is moved forward or backward by the contact of the spring $i^2$ with either one of two insulated contact-stops $i^3$, (shown in Fig. 9,) as the arms $i$ follow the motion of the crank-shaft and produce the closing of the circuit and the attraction of the armature of the electromagnet E⁵.

In addition to the printing of the ticket and indicating the price of the purchase visually on the sales-indicating disk H the sum of the sales made within a given period of time—for instance, in a day—is registered on a graduated dial I on the front wall of the casing, said dial being provided at its outer circumference with numbers corresponding to the numbers on the keys and indicating-disk H and at its inner circumference with a graduation divided into one hundred parts. Two index-hands I′ I² are arranged to move over the dial corresponding with the successive depressions of the keys, the index-hand I′ adding up the sales, while the index-hand I² is moved along the inner graduation after each complete rotation of the hand I′, so as to indicate thereby the total amount of the sales during a given time. The motion of the hands is accomplished by transmitting gear-wheels $n$ $n'$ $n^2$ $n^5$ $n^7$, the gear-wheel $n$ being mounted on the pivot-shaft C² and the intermediate gear-wheel $n'$ placed loosely on a short shaft supported on the front wall of the casing. The intermediate gear-wheel $n'$ meshes with the gear-wheel $n^2$, on the shaft $n^3$ of which is mounted the index-hand I′, which is moved over the dial corresponding to the depressions of the keys, so as to sum up the amounts of the sales. On the hub of the gear-wheel $n^2$ is placed a pinion $n^4$, which meshes with a larger gear-wheel $n^5$, on the shaft of which is placed a pinion $n^6$, that meshes with a gear-wheel $n^7$, which turns loosely on the shaft $n^3$. To the gear-wheel $n^7$ is attached a sleeve $n^8$, which is extended through the front wall of the casing and which carries the index-hand I², which is moved over the inner graduation of the dial, so as to register the rotations of the index-hand I′, and thereby the total amount of the sales in dollars, as usual in counting devices of this class.

On the rear surface of the gear-wheel $n^2$ is located a segmental recess $p'$, which at each full rotation of the wheel $n^2$ permits the dropping of an arm $p^2$, which is keyed to a horizontal spring-actuated crank-shaft $p^3$, that is supported in suitable bearings of a hanger-plate $p^4$, that is supported parallel with the front wall of the casing. The shaft $p^3$ carries at its opposite end a crank-arm $p^5$, which engages a crank $p^6$ on the shaft of a registering-counter Q (shown in Figs. 1 and 2) at the upper right-hand side of the casing. The crank-arm $p^5$ is actuated by a helical spring $p^7$, so as to produce the proper oscillations of the crank $p^6$ and arm $p^2$ when the latter drops into the recess $p'$ of the gear-wheel $n^2$. By the transmitting mechanism the registering-counter Q is operated with each full rotation of the gear-wheel $n^2$, so as to register simultaneously with the registering of the dollars by the index I² on the dial I the dollars on the counter Q, so as to produce thereby a record of the total amount of sales in dollars for a greater period of time, such as a week, month, or other suitable period of time. The registering-counter Q produces thereby, in addition to the adding up of the sales for a shorter period of time by the index-hands on the dial, the total amount of sales for a greater length of time, while the index-hands produce the counting of the sale for a shorter period—such as an hour, a day, &c.—as desired by the owner of the business in which the electric cash-register is used. The registering-counter Q serves thereby as an additional safeguard in controlling the proper working of the cash-register and the honesty of the employee operating the same.

On the pivot-shaft C² of the crank C is placed a ratchet-wheel C³, which is provided with circumferential teeth, that are engaged by a check-pawl C⁴, as shown clearly in Figs. 2, 3, and 4. The ratchet-wheel C³ is further provided with crown-teeth on its rear face, which are engaged by a push-pawl C⁵, that is mounted on the end of a radial arm C⁶, which is keyed to the pivot-shaft C² and which serves to engage the crown-teeth of the ratchet-wheel C³, so as to move the same in the direction indicated by the arrow in Fig. 1. The push-pawl C⁵ moves with the pivot-shaft C² in forward and backward direction, while the ratchet-wheel C³ is permitted to turn only in one and the same direction by the action of the check-pawl C⁴ and push-pawl C⁵. The ratchet-wheel C³ is connected to the gear-wheel $n$ by suitable rivets, the latter being placed, like the ratchet-wheel, loosely on the pivot-shaft, so that the two can move together and follow the motion imparted to it by the push-pawl, they being only moved when the crank C is turned in forward direction, but not when the crank and push-pawl are turned in backward direction. The pawl and ratchet-wheel serve for securing the proper and reliable working of the sales registering and counting devices before described.

Besides the registering-counter Q, on which the total amount of the sales is registered, a second counting device Q' is arranged, which, like the counter Q, is of any approved construction and intended to register the successive sales marked off by the check-register, so as to keep control of the exact number of transactions registered. The counter Q', as shown in Figs. 2, 3, and 4, is operated by the push-pawl-carrying arm $C^6$, which engages at each return to its normal position a pin $u$ on the end of a connecting-rod $u'$, that is acted upon by a helical spring $u^2$, attached to the guide-rod $u'$ and the supporting-bracket $u^3$ of the counter Q', as shown in Fig. 2. The connecting-rod $u'$ is pivoted to a crank-arm $u^4$ and the latter to a crank $u^5$ on the operating-shaft of the counter Q', by which the latter is operated in a manner similar to the counter Q, so as to register each actuation of the crank C and arm $C^6$ on their return to the normal or starting position, and thereby the number of times which they have been operated or the number of transactions checked off on the machine.

In addition to the electromagnets located in the main circuit of the battery one of a pair of electromagnets $E^6$ $E^7$ is arranged at the upper part of the casing and of which the electromagnet $E^6$ is located in the circuit of the magnets $E'$ $E^2$ $E^3$ $E^4$, while the electromagnet $E^7$ is located in a separate circuit of the battery $B^\times$. The electromagnet $E^7$ serves for the purpose of opening the main circuit when the operative parts of the cash-register are returned into their normal or starting positions. By the closing of the main circuit the armature of the electromagnet $E^6$ is attracted and locked by a hook $t'$ at the end of a pendent spring-actuated armature-lever $t^2$ of the electromagnet $E^7$, as shown in Figs. 4, 5, and 9. For releasing the armature-lever $t$ of the electromagnet $E^6$ from the hook $t'$ the circuit of the electromagnet $E^7$ has to be closed. This is accomplished by means of a pin $r$, which is located on the gear-wheel $h'$ and projects rearwardly from the same, so as to enter between two contact-springs $r'$, supported on an insulated post $r^2$, and close thereby the circuit of the electromagnet $E^7$, so that its armature is attracted and the armature-lever $t$ of the electromagnet $E^6$ released from the hook $t'$ of its armature-lever $t^2$, so that the armature-lever $t$ drops back into normal position on its stop-screw $t^3$. The stop-screw $t^3$ is supported on an insulation-post $t^4$ and is connected with the battery $B^\times$, so as to conduct the current over the armature-lever $t$ to the casing A, as shown in Fig. 9. When a sale is registered, the operating-crank is permitted to remain at the position to which it has been moved, and upon registering the next sale the operating-crank is returned to zero position, so that the pin $r$ of the gear-wheel $h'$ is moved into contact with the contact-springs $r'$ in order that the circuit of the electromagnet $E^7$ is closed, which causes the armature-lever $t$ to become released, so as to be placed in the circuit, which is closed when the operating-crank is brought into contact with the shank of the key that is depressed. The pin $r$ is arranged on the gear-wheel $h'$ at such a point that contact with the springs $r'$ is effected when the operating-crank and the gear-wheel $h'$ are turned to the position at zero, and by means of this arrangement the circuit of the electromagnet $E^7$ is opened or closed, so that the armature-lever $t^2$ is caused to engage or disengage the armature-lever $t$. The armature-lever $t^2$ is spring-actuated in the direction away from its electromagnet and rests upon the insulated stop-screw $r^3$, as shown in Figs. 4 and 5.

The operation of my improved electric cash-register is as follows: When a purchase is to be registered, a ticket is removed from the ticket-receiver and inserted into the opening in front of the printing device ready for being printed. The key corresponding to the amount of the purchase is then depressed by the thumb of one hand and the handle of the operating-crank taken hold of by the other hand, moved in backward direction to zero position, and then brought foward until the crank abuts against the shank of the depressed key. This closes the main circuit of the battery, so that all electromagnets in the main circuit are thereby excited, and simultaneously the ticket printed with the number corresponding to the number of the depressed key, the cash-drawer released and pushed forward into open position by its spring, the signal-bell rung, the shutter dropped, so as to show the amount of the sale on the sale-indicating disk to the purchaser, and the different registering and counting devices operated in the manner hereinbefore described. All these operations are accomplished almost simultaneously by the electromagnets in the main circuit and by the different transmitting mechanisms interposed between the crank-shaft and the different operating devices. Upon the contact of the operating-crank with the shank of the depressed key the main circuit is closed, which actuates its electromagnets, one of which—namely, $E^6$—acts as an automatic cut-off. The crank remains in the position in which it has been placed until the next sale is to be registered. To register the next sale, it is then returned to zero, which produces the excitation of the electromagnets $E^5$ and $E^7$, the return of the safety-shutter to its normal position in front of the sales-indicating disk H, and the return of the armature $t$ into contact with its stop-screw $t^3$, so that the main circuit can be closed again by the next contact of the operating-crank with the shank of the depressed key. When dollar-sales are to be registered in addition to cent-sales, a duplicate set of keys and additional registering devices have to be arranged in connection with separate electromagnets operated from the same battery.

The advantages of my improved electric cash-register are that all the operations of the same are performed regularly and automatically without permitting any interference by the operator, that all the sales are accurately registered for shorter and for longer periods of time, so that an effective control is obtained on the operator, while by the safety-shutter the possibility of tampering with the machine by marking off fraudulent sales is prevented, and, lastly, that the cash-register can be operated with or without the ticket attachment and the ticket-printing devices if the same are not required.

Having thus described my invention, I claim as new and desire to secure by Letters Patent—

1. In a cash-register, the combination, with a circular guide-frame provided with a number of spring-actuated keys, of an operating-crank provided with a handle, a pivot-shaft for said crank, a printing-cylinder, means for rotating said printing-cylinder simultaneously with the crank-shaft, an inking-ribbon, a fulcrumed armature-lever provided with a platen below said inking-ribbon and printing-cylinder, and an electromagnet for actuating the armature-lever and platen, said operating-crank and keys being in circuit with said electromagnet and adapted to close the circuit, substantially as set forth.

2. In a cash-register, the combination, with a circular guide-frame provided with a number of spring-actuated keys guided in the same and connected in electric circuit, of an operating-crank connected in electric circuit, a pivot-shaft attached to said crank, a printing-cylinder, means for rotating said printing-cylinder simultaneously with the pivot-shaft, an inking-ribbon extending below said printing-cylinder, means for guiding a ticket to be printed below said printing-cylinder, a fulcrumed armature-lever provided with a platen arranged below said printing-cylinder, and an electromagnet arranged in circuit with said keys and operating-crank adapted to actuate said armature-lever and platen upon contact of said operating-crank with said keys, substantially as set forth.

3. In a cash-register, the combination of a casing, a circular guide-frame attached to said casing, spring-actuated keys guided in said frame, an operating-crank provided with a handle and adapted to form contact with one of the shanks of said keys so as to close an electric circuit, a cash-drawer guided in the lower part of the casing, a flat spring acting on the rear wall of said cash-drawer, an electromagnet, an armature for said electromagnet, a pivoted intermediate piece, and a spring-actuated latch pivoted to the rear wall of the drawer and adapted to release the intermediate piece so as to permit the opening of the cash-drawer, substantially as set forth.

4. In a cash-register, the combination, with a circular guide-frame provided with a number of spring-actuated keys guided in the same, of an operating-crank, a pivot-shaft to which the crank is attached, a ratchet-wheel placed loosely on said pivot-shaft, a check-pawl engaging said ratchet-wheel, a push-pawl applied to an arm on said shaft, said push-pawl engaging said ratchet-wheel, a train of gear-wheels operated by said ratchet-wheel and push-pawl, a graduated dial, index-hands moving over said dial and being operated by said train of gear-wheels so as to register the total amount of sales for a given time, a registering-counter, and mechanism interposed between one of the gear-wheels of said train and said counter for indicating the total amount of sales for a longer period of time, substantially as set forth.

5. In a cash-register, the combination, with a circular guide-frame provided with a number of spring-actuated keys guided in the same, of a crank provided with a handle, a pivot-shaft to which the crank is attached, a ratchet-wheel, a push-pawl mechanism actuated by said pivot-shaft, a graduated dial, index-hands moving over said dial, a train of gear-wheels interposed between the ratchet-wheel and said index-hands so to register the total amount of sales for a given time, a registering-counter, and motion-transmitting mechanism interposed between the push-pawl and said registering-counter to actuate the latter so as to register the number of sales made within a given time, substantially as set forth.

6. In a cash-register, the combination, with a main casing, of a circular guide-frame on said casing provided with a number of spring-actuated keys guided in the same, a crank provided with a handle, a pivot-shaft to which the crank is attached, a rotatable sales-indicating disk, a train of gear-wheels between the pivot-shaft and the shaft of the disk for rotating the same with the crank, an auxiliary casing on the top part of the main casing provided with an opening for inclosing said sales-indicating disk, a safety-shutter, electrically-operated means for dropping said shutter so as to exhibit the amount of a sale, and electrically-operated means for returning the shutter into its normal position when the crank is returned to its initial position, substantially as set forth.

7. In a cash-register, the combination, with a main casing provided with an auxiliary casing on its top part, of a circular guide-frame provided with a number of spring-actuated keys, a crank provided with a handle, a pivot-shaft to which the crank is attached, a rotatable sales-indicating disk provided with numbers corresponding to the numbers on the keys, a train of gear-wheels interposed between the pivot-shaft and the shaft of the disk for rotating the same together with the crank, a safety-shutter for closing an opening in said auxiliary casing in front of the sales-indicating disk, electrically-operated means for releasing and dropping said shutter so as to indicate the number on the disk corresponding to the number on the actuated key, and electrically-operated mechanism for returning the shutter into normal raised position when the crank is returned to its starting position, substantially as set forth.

8. In a cash-register, the combination, with a main casing provided with an auxiliary casing on its top part, said auxiliary casing having an opening, of a circular guide-frame attached to the main casing and provided with a number of spring-actuated keys guided in the same, a crank provided with a handle, a pivot-shaft to which the crank is attached, a rotatable sales-indicating disk provided with numbers corresponding to the numbers on the keys, a train of gear-wheels between the pivot-shaft and the shaft of the disk for moving the same simultaneously with the crank, a safety-shutter arranged back of the opening in the auxiliary casing and in front of the disk, electrically-operated mechanism for dropping the shutter so as to expose the number on the disk in the opening of the auxiliary casing, a circuit-closing device operated by the crank, and electrically-operated mechanism for returning the shutter into its normal position after the circuit-closing device has been operated, substantially as set forth.

9. In a cash-register, the combination, with a casing provided with an auxiliary casing at its top part, said auxiliary casing having an opening in its front wall, of a circular guide-frame attached to the front wall of the casing and provided with a number of spring-actuated keys guided in the same, an operating-crank provided with a handle, a pivot-shaft to which the crank is attached, a rotatable sales-indicating disk provided with numbers corresponding with the numbers on the keys, a train of gear-wheels between the pivot-shaft and the shaft of the disk for turning the latter with the crank, a safety-shutter arranged in front of the disk and adapted to close the opening in the auxiliary casing, electrically-operated means for dropping the shutter so as to exhibit the number to which the disk has been set in the opening of said auxiliary casing, electrically-operated mechanism for returning the shutter into its normal position back of the opening in the auxiliary casing, and a circuit-closing device for actuating said electrically-operated returning means, said circuit-closing device consisting of a number of radial arms on the pivot-shaft, an oscillating contact-spring and insulated contact-pins, substantially as set forth.

10. In a cash-register, the combination, with a main circuit containing a number of electromagnets for actuating the different operating parts, of a circular guide-frame provided with a number of spring-actuated keys guided in the same, an operating-crank provided with a handle, a pivot-shaft to which the crank is attached, a circuit-opening electromagnet and armature-lever in the main circuit of the battery, an auxiliary electromagnet located in an auxiliary circuit of the battery, a spring-actuated armature-lever for the auxiliary electromagnet adapted to engage the armature-lever of the circuit-opening electromagnet, and a circuit-closing device for the auxiliary circuit operated by the return of the crank to its initial position for breaking the main and auxiliary circuits and restoring the armature-levers of the electromagnets to their normal position of rest, substantially as set forth.

In testimony that I claim the foregoing as my invention I have signed my name in presence of two subscribing witnesses.

JOHANN C. VAHJEN.

Witnesses:
PAUL GOEPEL,
HENRY SUHRBIER.